US011873795B2

(12) United States Patent
Kofman

(10) Patent No.: US 11,873,795 B2
(45) Date of Patent: Jan. 16, 2024

(54) WIND TURBINE MAIN ROTOR TURNING SYSTEMS

(71) Applicant: Vestas Wind Systems A/S, Aarhus N. (DK)

(72) Inventor: Joris Kofman, Aalborg Øst (DK)

(73) Assignee: Vestas Wind Systems A/S, Aarhus N (DK)

( * ) Notice: Subject to any disclaimer, the term of this patent is extended or adjusted under 35 U.S.C. 154(b) by 26 days.

(21) Appl. No.: 17/626,950

(22) PCT Filed: Jul. 7, 2020

(86) PCT No.: PCT/DK2020/050207
§ 371 (c)(1),
(2) Date: Jan. 13, 2022

(87) PCT Pub. No.: WO2021/008663
PCT Pub. Date: Jan. 21, 2021

(65) Prior Publication Data
US 2022/0260060 A1    Aug. 18, 2022

(30) Foreign Application Priority Data
Jul. 17, 2019    (DK) .......................... PA 2019 70468

(51) Int. Cl.
F03D 15/00    (2016.01)
(52) U.S. Cl.
CPC .......... *F03D 15/00* (2016.05); *F05B 2240/60* (2013.01); *F05B 2260/4031* (2013.01)
(58) Field of Classification Search
CPC ...................................................... F03D 15/00
See application file for complete search history.

(56) References Cited

U.S. PATENT DOCUMENTS 8,450,871 B2    5/2013    Trede
9,556,854 B2    1/2017    Goettsche
(Continued)

FOREIGN PATENT DOCUMENTS

CN    102741547 A    10/2012
CN    103718433 A    4/2014
(Continued)

OTHER PUBLICATIONS

English Translation of CN-205013203-U (Year: 2016).*
(Continued)

*Primary Examiner* — Sean Gugger
(74) *Attorney, Agent, or Firm* — Wood Herron & Evans LLP

(57) ABSTRACT

A turner gear arrangement (60) for turning a rotor of a wind turbine via a drivetrain thereof; said turner gear arrangement (60) comprising a motor (68), a torque transmission assembly (90), and a mounting assembly (80); said torque transmission assembly (90) comprising one or more rotational elements and including a turner output drive (92) rotating about an axis (R), said turner output drive (92) being operably coupled to and driven by said motor (68) and configured to transmit rotational motion to a gearbox output shaft of a said drivetrain, said turner output drive (92) further including an output guide portion (94); said mounting assembly (80) being configured to mount said motor (68) and said transmission assembly (90) in a fixed relation with respect to a wind turbine drivetrain; and wherein said mounting assembly (80) further includes a radial support interface (86) which operably engages with said output guide portion (94), to constrain movement of said turner output drive (92) in a direction transverse to its rotational axis (R). Also a wind turbine drivetrain arrangement, comprising a drivetrain (20) including a rotor shaft (26) fixable (Continued)

to a wind turbine rotor hub (8), a gearbox (22) and a drivetrain housing, wherein the rotor shaft (26) is coupled to the gearbox (22) at a gearbox input coupling, and wherein the gearbox (22) includes an output drive shaft (38) defining a rotational axis (R); the drivetrain arrangement further comprising a turner gear (60).

15 Claims, 11 Drawing Sheets

(56) References Cited

U.S. PATENT DOCUMENTS

| | | | |
|---|---|---|---|
| 10,197,075 B2 | 2/2019 | Brokes et al. | |
| 2006/0196288 A1 | 9/2006 | Aust et al. | |
| 2009/0278359 A1* | 11/2009 | Trede | F03D 80/00 290/55 |
| 2015/0118056 A1* | 4/2015 | Rose, Jr. | F03D 80/50 29/889 |
| 2015/0260164 A1 | 9/2015 | Su | |
| 2017/0288501 A1* | 10/2017 | Eriksen | H02K 7/00 |

FOREIGN PATENT DOCUMENTS

| | | | |
|---|---|---|---|
| CN | 205013203 U | * | 2/2016 |
| CN | 205013203 U | | 2/2016 |
| CN | 108349587 A | | 7/2018 |
| CN | 106762459 B | | 7/2019 |
| EP | 2159472 A1 | | 3/2010 |
| EP | 3226384 A1 | | 10/2017 |
| IN | 201334993 Y | | 10/2009 |
| KR | 20160048318 A | | 5/2016 |

OTHER PUBLICATIONS

Danish Patent and Trademark Office, Search and Examination Report in PA 2019 70468, dated Jan. 20, 2020.

European Patent Office, International Search Report and Written Opinion in PCT Application No. PCT/DK2020/050207, dated Sep. 25, 2020.

China National Intellectual Property Administration, office action issued in corresponding Chinese Application No. 202080053722.7, dated Apr. 15, 2023, with English translation.

* cited by examiner

WIND TURBINE MAIN ROTOR TURNING SYSTEMS

FIELD OF THE INVENTION

The invention relates to turning a rotor of a wind turbine, which may be particularly useful during installation and maintenance activities. Aspects of the invention relate to a turner gear arrangement at a wind turbine, a drivetrain and a method.

BACKGROUND OF THE INVENTION

In a typical 'horizontal axis' wind turbine, a nacelle mounted on a tower supports a rotor that includes a plurality of blades. The nacelle houses a main bearing arrangement which supports the rotor so that it is able to rotate as the blades are driven by the wind. The rotor forms the input end of a drivetrain of the wind turbine which typically includes the rotor, a gearbox and a generator, although direct drive wind turbines are known that do not include a gearbox. In some instances a drivetrain may refer only to the mainshaft and gearbox, while a powertrain may refer to such a drivetrain additionally including a generator. In the present disclosure, the term "drivetrain" may be used to refer to an assembly including mainshaft and gearbox, or mainshaft, gearbox and generator. In a known configuration, the main rotor of the wind turbine is coupled to a so-called 'low-speed' shaft which is in turn coupled to the input end of the gearbox. The gearbox also includes a high-speed output shaft, to which the generator is coupled.

During construction of utility-scale horizontal axis wind turbines it is usually necessary to assemble the blades, rotor hub and nacelle on-site. This involves mounting the nacelle on the erected tower and then connecting the rotor components to the nacelle, whereby the blades may be installed one-by-one successively onto the rotor hub. In a known approach, each blade to be installed along a particular angular direction, e.g. at a so-called 3-o'clock position or 6-o'clock position etc. After attachment of a first rotor blade, the rotor hub may be turned by a drive system installed in the nacelle so that the rotor is brought into a selected orientation to enable attachment of a second blade. So, after the first blade is installed, the rotor hub may be rotated for the next blade to be installed at the same angular direction about the hub as the previous one. In a conventional three-bladed wind turbine, this may require turning the unbalanced, i.e. the still to be assembled rotor through an angle of rotation of 120 degrees.

With only a single blade, or with only two blades attached to a hub, the rotor is unbalanced. Hence, a higher torque will be required to turn a wind turbine mainshaft during assembly of its rotor than with a fully assembled rotor. Therefore a turner system for a wind turbine rotor must be capable of generating high torque in order to turn the main rotor when it is an unbalanced condition e.g. with less than a full complement of blades. Typically the turning of a mainshaft may be achieved by coupling a drive device or 'turner device' to the high speed shaft of the wind turbine's drivetrain. In this way, the torque applied to the high speed shaft is increased by the gearbox at the low speed shaft, i.e. at the hub, to cause rotation of the rotor. Other approaches are also known.

By way of further example, U.S. Pat. Nos. 9,556,854 and 8,450,871 demonstrate systems that apply driving torque directly to the high-speed shaft of a wind turbine drivetrain using small scale auxiliary kits. However, such an approach may be unsuitable to larger wind turbines where higher torque levels are required. EP2159472A1 describes a mainshaft-driven pump arrangement in a wind turbine which may be implemented as a hydraulic drive device, in which a drive element is positioned on the low-speed shaft between the main bearing and the gearbox. U.S. Ser. No. 10/197,075 describes a similar device in which a high torque drive element is positioned on the gearbox high-speed shaft. With increasing wind turbine size, the amount of torque required to be applied by a turner drive for turning an unbalanced rotor can impose design limitations on the drivetrain or on elements thereof, or can prohibit the use of longer blades in combination with a given powertrain. Hence, there is a need to provide an improved turner drive arrangement, enabling higher torque levels to be applied, without adverse effects.

It is against this background that the invention has been devised.

SUMMARY OF THE INVENTION

According to a first aspect of the invention there is provided a turner gear arrangement for turning a rotor of a wind turbine; the turner gear arrangement comprising a motor, a torque transmission assembly, and a mounting assembly; the torque transmission assembly comprising one or more rotational elements and including a turner output drive rotating about an axis, the turner output drive being operably coupled to and driven by the motor and configured to directly or indirectly transmit rotational motion to a gearbox output shaft of a wind turbine drivetrain, the turner output drive further including an output guide portion; the mounting assembly being configured to mount the motor and the transmission assembly in a fixed relation with respect to a wind turbine drivetrain; and wherein the mounting assembly further includes a radial support interface which operably engages with the output guide portion to constrain movement of said turner output drive in a direction transverse to its rotational axis (R). In this way, the radial support interface of the tuner gear radially supports the turner output drive about its axis (R).

A benefit of the invention is that the radial constraint provided on the turner output drive functions as a bearing for the turner output drive and so ensures that transverse movement away from its intended rotational axis is avoided. This increases stability of both the turner gear and the drivetrain to which it is applied. A turner gear arrangement is defined in appended claim 1. Further optional features thereof are defined in subclaims 2-11.

Furthermore, there is provided a wind turbine drivetrain arrangement, comprising: a drivetrain including a rotor shaft fixable to a wind turbine rotor hub, a gearbox and a drivetrain housing, wherein the rotor shaft is coupled to the gearbox at a gearbox input coupling, and wherein the gearbox includes an output drive shaft defining a rotational axis; the drivetrain arrangement further comprising a turner gear arrangement defined above, and wherein the transmission assembly of the turner gear arrangement is removably drivingly coupled to the gearbox output shaft so as to transfer torque to the rotor shaft through the gearbox, wherein the radial support arrangement of the turner gear assembly is removably in a fixed relationship to the drivetrain housing and constrains movement of the rotational drive element of the transmission assembly in a direction transverse to its rotational axis. The radial support interface is preferably in a fixed relationship to the drivetrain housing and constrains movement of the turner output drive in a direction transverse to the rotational axis. A drivetrain arrangement is defined in appended claim 12. Further optional features thereof are defined in subclaims 13-16.

Furthermore, the invention can also be expressed as a method of rotating a rotor of a wind turbine, the wind turbine comprising a drivetrain comprising a main rotor shaft, a gearbox, a gearbox output shaft and a generator. The method comprises providing a turner drive arrangement, as defined above, mounting it in a fixed relationship with respect to the drivetrain, coupling the turner output drive directly or indirectly to the gearbox output shaft so that the radial support interface constrains radial movement of the turner output drive in a direction transverse to the rotational axis thereof, and driving the turner output drive to apply torque to the gearbox output shaft and thereby rotating the main rotor shaft of a wind turbine through the gearbox. The method may further include rotating a hub of a wind turbine installed on the rotor shaft. The method may further include removing the turner gear assembly before operating the wind turbine for power generation.

The function of the radial support interface is to support the turner output drive so that it does not depart transversely from the rotational axis of the turner output drive. This can be achieved in numerous ways. One option is for the turner output drive to be supported circumferentially, and this may be achieved by arranging one or more bearing surfaces that extend circumferentially about the turner output drive. For example, a single bearing surface can extend entirely about the drive element defining a cylindrical surface parallel to the rotational axis. Alternatively, a plurality of bearing surfaces may be provided. Such bearing surfaces may be static, or they may be dynamic, as would be the case if said bearing surfaces were provided by slave pinions arranged circumferentially about the drive element.

In one embodiment, the turner output drive may include a circumferential guide portion that is slidably engaged with a circumferentially extending surface of the radial support interface. An output guide portion of the turner output drive may therefore slidably mate with the radial support interface, providing a radially constraining arrangement.

The radial support interface may be mounted in a fixed relationship with respect to a drivetrain housing e.g. via a mounting bracket that attaches directly or indirectly to the drivetrain housing. Attaching the radial support interface to the drivetrain housing provides a robust and fixed positional mounting point for the turner gear.

In addition to mounting the radial support arrangement, a mounting bracket may serve to support other components of the turner drive. For example, a mounting bracket may support at least one drive motor unit that is operatively coupled to the turner output drive. In other embodiments, a plurality of motors may be provided. These may be spaced about the circumference of the drive element.

Conveniently, the turner output drive may be coupled directly or indirectly to a generator rotor, associated with the gearbox output shaft of the drivetrain. An adapter element may be provided to adapt the turner output drive to the gearbox output shaft or to a rotating rotor shaft of a generator. Through this means, a same turner gear could be used on different drivetrain configurations.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

The above and other aspects of the invention will now be described, by way of example only, with reference to the accompanying drawings, in which.

The drawings are examples for explanatory purposes only and do not show all possible embodiments included by the scope of the appended claims. Note that features that are the same or similar in different drawings are denoted by like reference signs. For simplicity and clarity, not all possible reference signs are replicated in all drawings.

DETAILED DESCRIPTION OF EMBODIMENTS OF THE INVENTION

The invention will now be described with reference to numerous features, some of which will be discussed in detail in order to provide a thorough understanding of the inventive concept as defined in the claims. However, it will be apparent to the skilled person that the invention may be put in to effect without including all of the specific details and that in some instances, well known methods, techniques and structures have not been described in detail in order not to obscure the invention unnecessarily.

Figure 1:
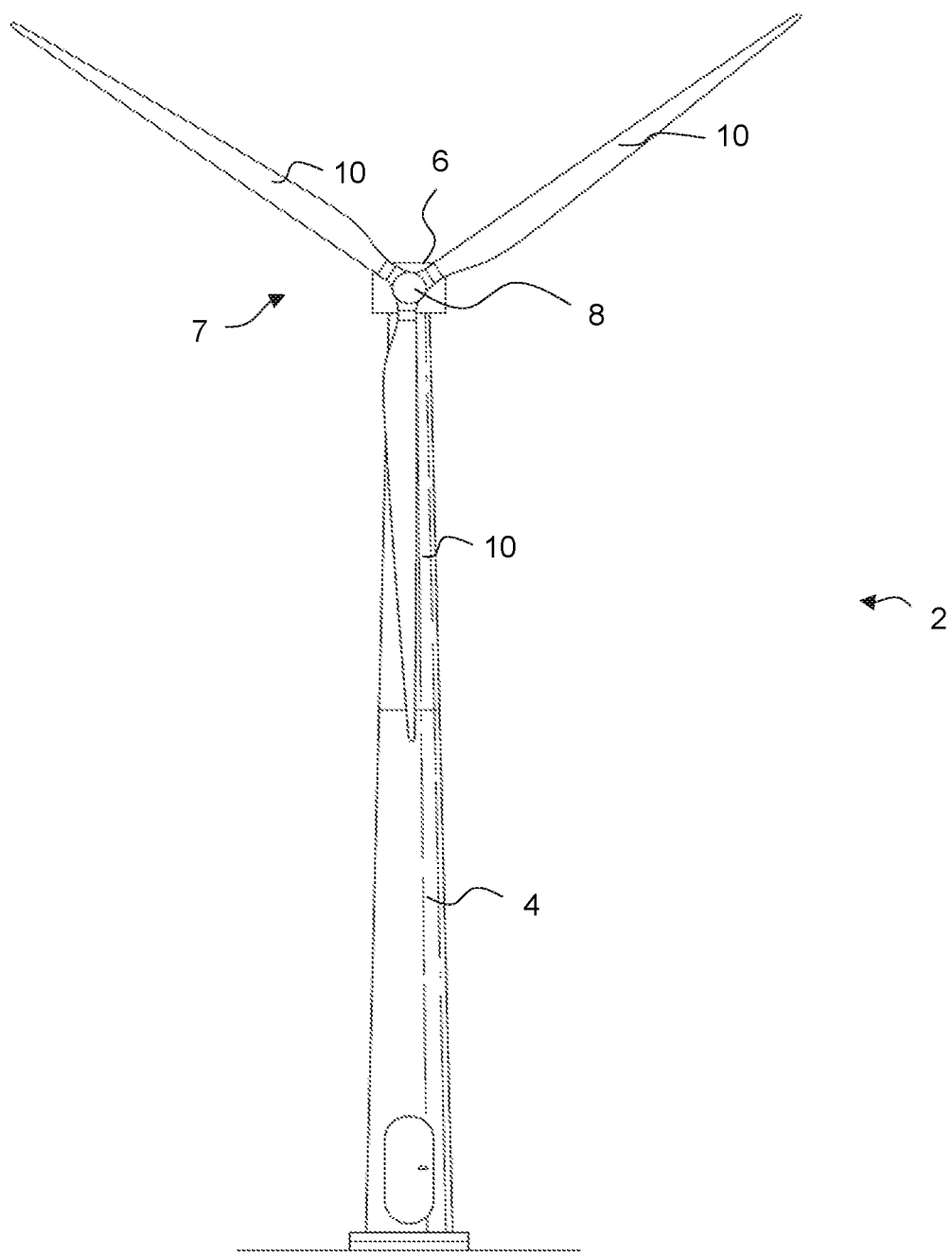
FIG. 1 is a front view of a wind turbine in which embodiments of the invention may be implemented.
Figure 2:
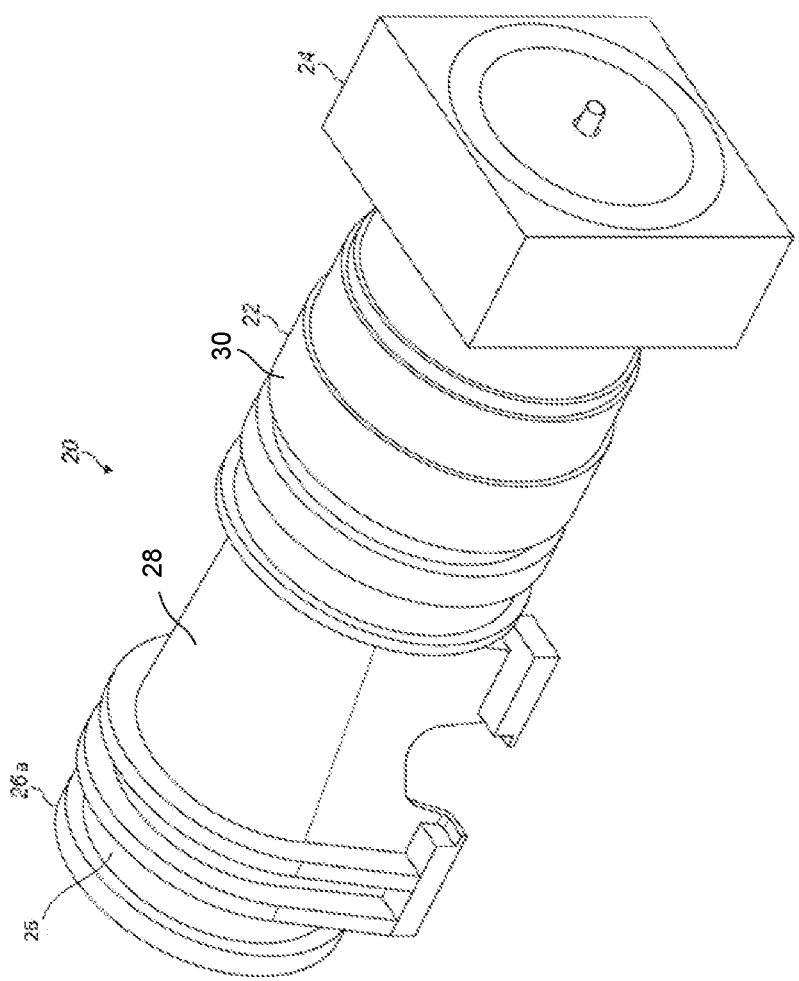
FIG. 2 is a perspective view of a wind turbine drivetrain which may be housed within a wind turbine of FIG. 1, and in connection with which embodiments of the invention may be implemented.

In order to place the embodiments of the invention in a suitable context, reference will firstly be made to FIG. 1 which illustrates a typical Horizontal Axis Wind Turbine (HAWT) 2 that includes an electrical power generating arrangement, as is shown in FIG. 2. Although this particular image depicts an on-shore wind turbine, it will be understood that equivalent features will also be found on off-shore wind turbines. In addition, although such wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 2 comprises a tower 4, a nacelle 6 rotatably coupled to the top of the tower 4 by a yaw system (not shown). A main rotor 7 is mounted to the nacelle 4. The main rotor 7 comprises a plurality of wind turbine blades 10 coupled to a hub 8. A yaw system may turn the nacelle 4 to bring the main rotor 7 to face the wind direction.

As mentioned above, the nacelle 6 houses an electrical power generating arrangement, which includes a drivetrain 20. In some cases, when a generator 24 is connected to a drivetrain 20, the resulting assembly may sometimes be referred to as a powertrain. Both terms are used in the technical art, and 'drivetrain' will be used from now on for consistency. As will be understood by those skilled in the art, a wind turbine drivetrain 20 may comprise a main rotor shaft 26 and a gearbox 22. A generator 24 may be attached to the gearbox 22 or to a gearbox output shaft.

The main rotor shaft 26 is supported by a mainshaft bearing 32, 34 inside a main bearing housing 28 and is connected to, and driven by, the main rotor 7 thereby providing input drive to the gearbox 22 via its low-speed input shaft 36. A main rotor shaft 26, sometimes referred to as a mainshaft, may be coupled to a main rotor hub 8 at a mainshaft coupling 26a such as a flange. The gearbox 22 steps up the rotational speed of the main rotor shaft 26 via internal gears (not shown) and drives a gearbox output shaft 38 (not shown in FIG. 2) also known as a high-speed shaft. The gearbox output shaft 38 in turn may drive a generator 24, which converts the rotation of the main rotor shaft 26 into electricity. The electricity generated by the generator 24 may then be converted by other components (not shown) as required before being supplied to an appropriate consumer, for example an electrical grid distribution system.

The gearbox 22 and a generator 24 may be coupled together in an integrated unit as shown in FIG. 2. Such an integrated unit is shown in FIG. 2, but it should be noted that the gearbox 22 and generator 24 need not be integrated and could instead be separated axially. In any case, the generator 24 and gearbox 22 may axially separable.

A gearbox 22, preferably has housing 30. The illustrated housing 30 has a generally cylindrical form although other shapes of gearbox and gearbox housing may also be implemented such as e.g. rectangular or more complex. For clarity, internal detail of the gearbox 24 will not be described further here. The drivetrain housing may be separable and may include multiple elements, such as a main bearing housing 28, a gearbox housing 30 and e.g. a generator housing 53.

Further details of a drivetrain will now be described with reference also to FIG. 3 which shows some components more clearly. It should be noted here FIG. 3 is schematic in form and so for brevity and clarity some components of drivetrain 20 or a generator 24 are not shown or described.

Figure 3:
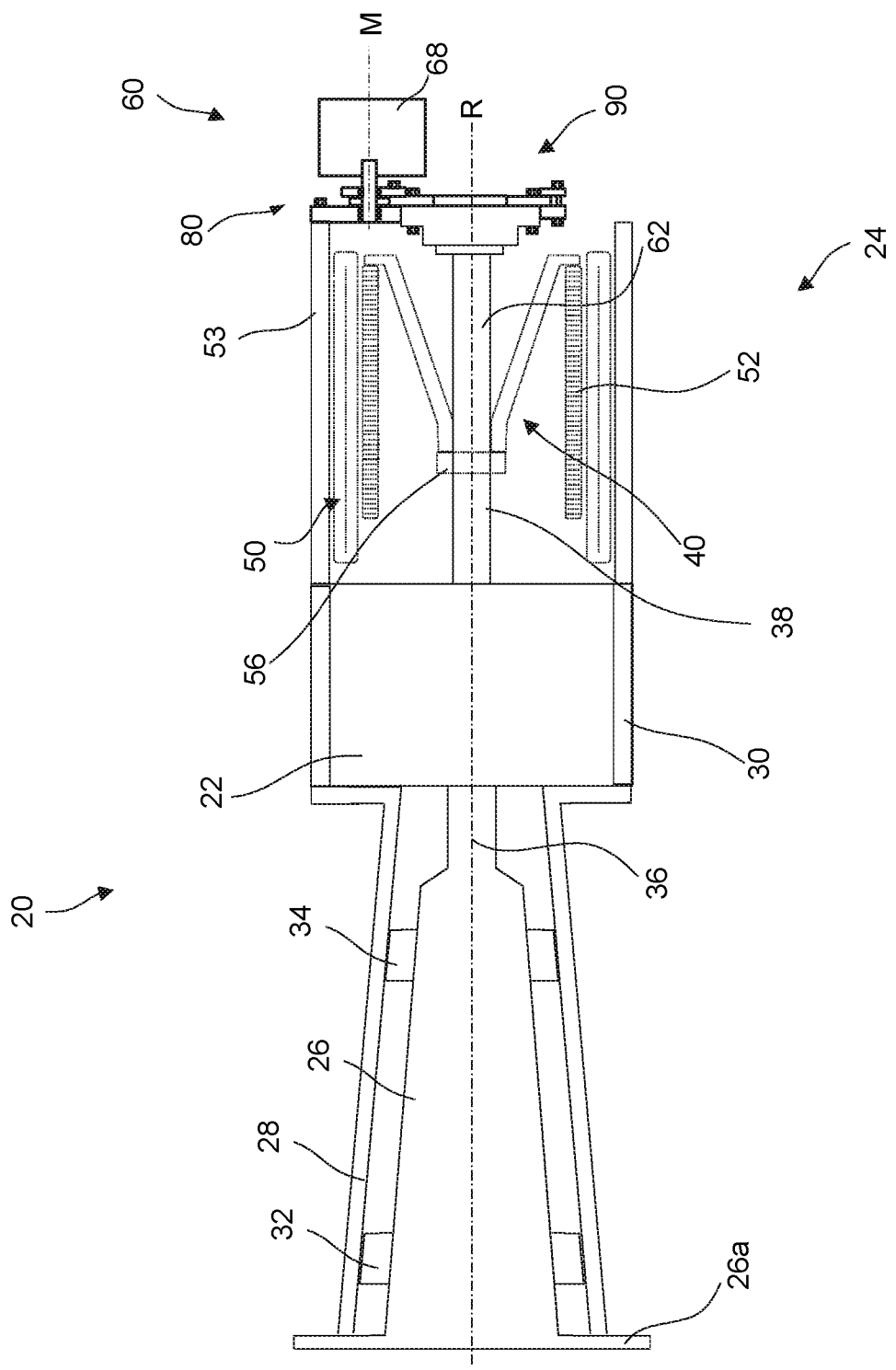
FIG. 3 shows a schematic, sectioned side view of a drivetrain, showing a turner gear arrangement in accordance with features of the invention.

As can be seen in FIG. 3, in the illustrated embodiment, a main rotor shaft 26 may be encased in a main bearing housing 28, and supported by a main shaft bearing 32, 34 which may comprise a front bearing 32 and a rear bearing 34. The axially-spaced bearings 32,34 ensure that the main rotor shaft 26 is supported to rotate about a rotational axis. The main shaft bearing 32, 34 is sufficiently massive and resilient to ensure stability and rigidity in view of the high loads that are imposed upon it, notably by a rotating main rotor 7, driven by the wind. The output shaft 38 of the illustrated gearbox 22 is shown co-axial with the main rotor shaft 26, although many gearbox configurations may be implemented in which the output shaft rotational axis is offset from the axis of the main rotor shaft 26.

The main rotor shaft 26 may in particular be coupled to the gearbox 22 at a gearbox input shaft 36. Similarly, the gearbox 22 may be coupled to a generator 24 via a gearbox output shaft 38. The gearbox output shaft 38 may be coupled to a rotor 40 of a generator 24, hereinafter 'generator rotor' 40. Together, the gearbox output shaft 38 and the generator rotor 40 may be coupled together to rotate at the same rotational speed whilst in use.

In the illustrated embodiment, the generator 24 may be an IPM (interior permanent magnet) electric machine having a concentric rotor 40 and stator 50. In the illustrated example, the stator 50 may surround the generator rotor 40. In this way, the generator rotor 40 may rotate in the cylindrical volume defined by the stator 50. The active components of the generator 24 may be housed within a generator housing 53. In this embodiment, the generator housing 53 is shown approximately cuboidal in form, as can be seen in FIG. 2 although other generator housing 53 shapes or configurations may be implemented. The stator 50 may include stator windings which are shown here schematically. It should be noted that the invention is not restricted to the specific configuration of stator 50 that is shown here.

In the illustrated embodiment, the generator rotor 40 may be supported on a rotor hub 56, drivingly coupled to a gearbox output shaft 38. For example, a rotor hub 56 may be mounted in driving engagement on a gearbox output shaft 38. Alternatively, a rotor shaft 62 may be provided as an extension of a gearbox shaft 38 e.g. it may be drivingly coupled to a gearbox output shaft 38. A rotor hub 56 may then be mounted in driving engagement on the rotor shaft 62. The rotor 40 may comprise a cylindrical magnet package arranged to rotate around the generator's rotational axis.

For efficient generation of electric current, a generator rotor 40 and its stator 50 may be mounted in relative rotation in such a way as to minimise the spacing between them. On the other hand, contact between rotor 40 and stator 50 during operation could be destructive. Hence, it may be important to ensure that the generator rotor 40 is maintained accurately in rotation about its axis, without drifting laterally, i.e. without drifting off-axis in a radial direction, thereby risking damaging collision between the generator rotor 40 and the stator 50.

Ordinarily, and as mentioned already, the wind turbine main rotor 7 drives the generator rotor 40 in rotation thereby generating electric current. On the other hand, during installation or maintenance work, the main rotor 7 may be required to be positioned at predetermined angular orientations to permit wind turbine blade 10 connection to a hub 8, or blade removal and replacement from a hub 8. This may be facilitated by means of a turner gear apparatus which can be installed to apply torque to turn a main rotor shaft 26. A turner gear may generally include a mechanical drive system including a linear or a rotary drive. It has been suggested to apply a turning action directly to a main rotor shaft 26. It has also been suggested to apply a turning action at a gearbox output shaft 38, thereby utilising the gearbox 22 for increasing the torque of a turner gear apparatus. This type of arrangement may be preferred in particular when a high level of torque is required, such as for larger size wind turbine rotors or for unbalanced rotors e.g. during construction or servicing. It has been found, however, that turner gear apparatus applied to a gearbox high speed shaft, i.e. at a gearbox output shaft 38, can apply considerable strain at the gearbox 20 or at components coupled downstream of the gearbox 20, such as a generator 24. This may in particular arise when a turner gear is compact, e.g. when its drive motor arrangement is unevenly distributed around the gearbox output shaft 38. For example, it may be desirable to implement a turner gear which has small dimensions, either for ease of inserting such a turner gear onto a relatively inaccessible drivetrain, or for ease of handling of the turner gear by service personnel during its installation or removal, or for other reasons. Such a compact turner gear with a single drive motor or a cluster of drive motors all installable at one side of a gearbox shaft may have the advantage or necessity of compactness, but it may be more susceptible to apply asymmetric loads to the relevant shaft onto which it is applied for driving a turning action of a wind turbine main rotor 7. Asymmetric load application onto a rotating shaft may tend to cause a certain amount of drifting movement of the driven shaft, off its axis, i.e. perpendicular to its rotational axis. High-torque turner gear equipment is increasingly needed to turn ever bigger wind turbine main rotors 7, such that there may be an increased risk of pushing the driven shaft off its intended rotational axis.

Figure 4:
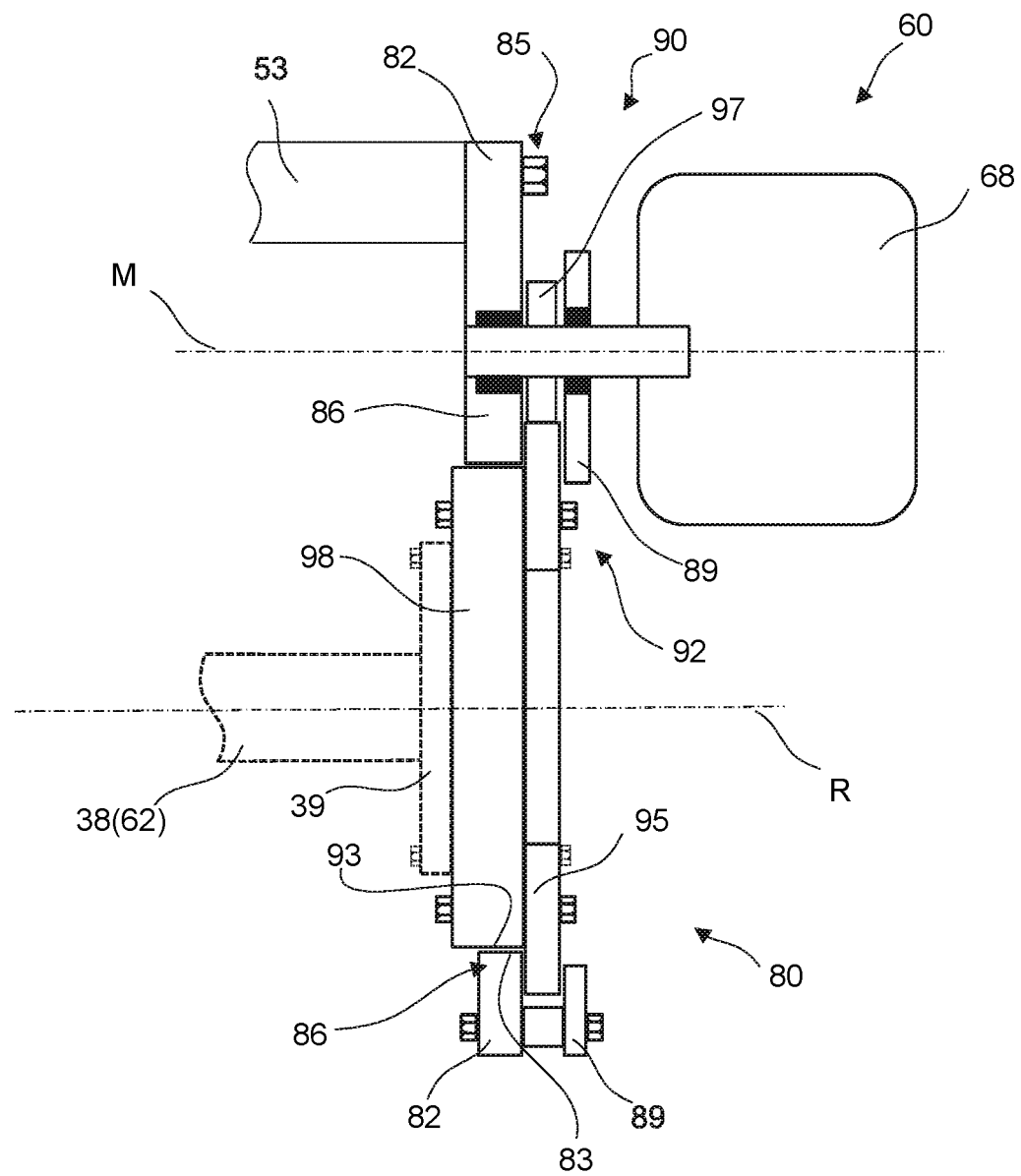
FIG. 4 shows a sectioned side view of a turner gear arrangement which may be implemented at a wind turbine drivetrain.
Figure 5:
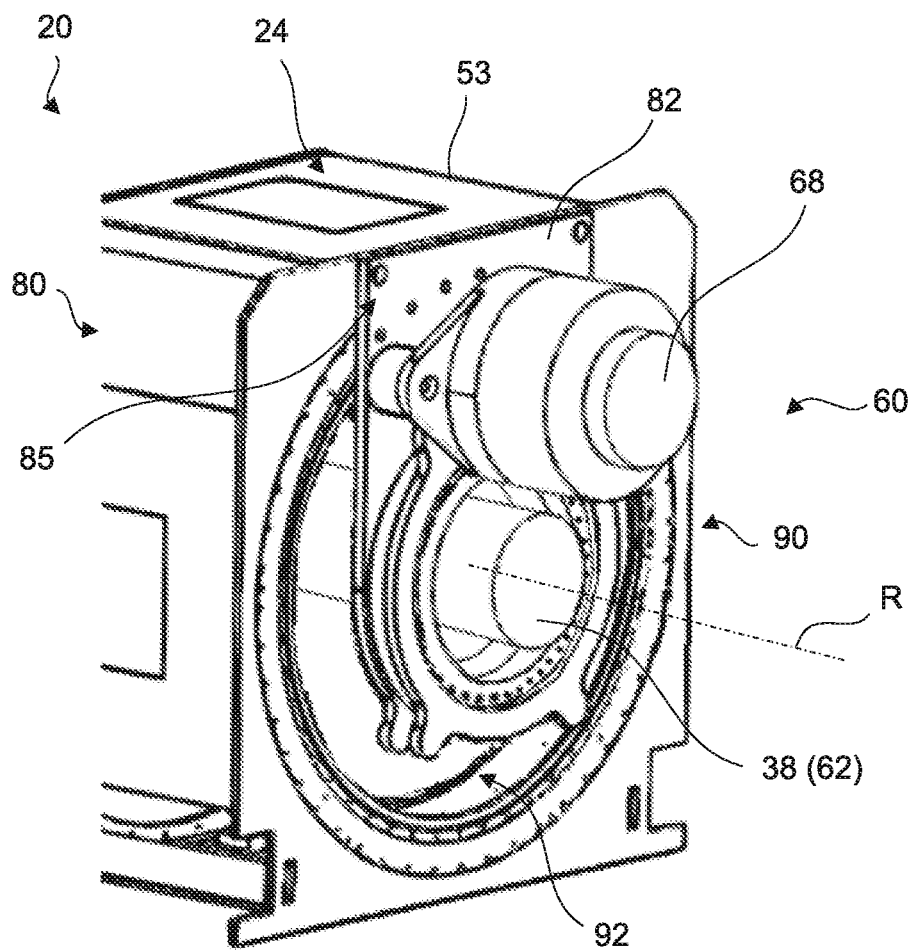
FIG. 5 shows a view of a turner gear arrangement mounted at a part of a drivetrain.

Embodiments of the invention that provide a solution to the above issue are shown in FIGS. 3, 4 and 5 and will now be discussed in further detail below.

In particular, a turner gear 60 is provided, which includes a motor 68, a mounting assembly 80, and a transmission assembly 90 including a turner output drive 92. The motor 68 may in particular be a drive motor such as rotational motor, also known as a torque motor. The turner output drive 92 is driven in rotation by the action of the motor 68, e.g. via a drive pinion 97. The mounting assembly 80 further includes a radial support interface 86 preventing radial movement of the turner output drive 92, i.e. preventing movement of the turner output drive 92 in a direction perpendicular to its rotational axis R. The turner gear 60 of the present invention thereby can be applied at the high-speed side of a gearbox 22, benefitting from the torque effect of the gearbox while at the same protecting against the possibility of a generator 24, coupled to the gearbox output shaft 38, becoming damaged as a result of its rotor 40 drifting off-axis into a collision with the stator 50. In FIG. 3, a turner gear arrangement 60 in accordance with an embodiment of the invention is shown proximate to a generator 24 and at a downstream side thereof, although it could equally well be installed between a gearbox 22 and a generator 24. The turner gear arrangement 60 is shown coupled in a fixed relationship to a drivetrain housing, which in the case illustrated may be a portion of a generator housing 53. As shown, the turner gear arrangement 60 is fixed directly to the drivetrain 20 although this does not need to be the case and instead it may be connected to another component that is also fixed to the drivetrain 20 e.g. at a drivetrain housing such as at a gearbox housing 30 or generator housing 30 or main shaft housing 28.

The turner gear arrangement 60 is preferably removable. This means it can be installed at a drivetrain 20 when needed, for example during installation work when it is necessary to be able to rotate the main rotor 7 slowly and to specific angular positions in order to permit the blades 10 to be installed from desired approach angles. Such control over the position of a main rotor 7 will also be needed in some maintenance situations, for example during a hub 8 replacement.

The turner gear arrangement 60, or more simply just 'turner gear', may be coupled directly or indirectly to a gearbox output shaft 38 so as to transfer torque to the main rotor shaft 26 through the gearbox 22. As can be seen in FIG. 3, a turner gear arrangement 60 may be drivingly coupled to a gearbox output shaft 38 via a rotor shaft 62, coupled to a gearbox output shaft 38 or constituting an extension thereof. A generator rotor hub 56 may optionally be directly or indirectly coupled to the gearbox output shaft 38 or rotor shaft 62 to be in rotational driving engagement therewith. Preferably, a generator 24 may be fixedly, but removably coupled to a gearbox 20 in such a way as to ensure a diving engagement between the gearbox output shaft 30 and a generator 24. The turner gear 60 may thus be drivingly coupled to the gearbox output shaft 38 directly or via any suitable element. A coupling between the turner gear 60 and a gearbox output shaft 38 may include intermediate adaptor members, some examples of which are shown below. In some cases, it may be desirable to couple a turner gear 60 to a gearbox output shaft via a brake disc (not shown). It should be noted that the schematic view of FIG. 3 depicts but one way in which the coupling between the turner drive 60 and the gearbox output shaft 38 may be achieved.

A turner gear 60 includes a transmission assembly 90 which may be operatively coupled to the gearbox output shaft 38 and which transmits rotational drive from a turner gear motor 68 to a turner gear output drive 92 of the transmission assembly 90. turner output drive 92 is rotatably installed about rotational axis R.

The motor 68 may be any suitable motor for the task, although it is envisaged that an electric motor or a hydraulic motor may be most suitable. Here, the drive pinion 97 may have a smaller diameter than the ring gear portion of the turner output drive 9. This may serve to gear down the rotational speed of the motor 68. In FIG. 4, which shows a vertical section though a turner gear arrangement, the illustrated drive pinion 97 is shown being driven directly by the motor 68 about a motor axis M. The motor axis M is shown transversely offset from the rotational axis R of the turner output drive 92. A different arrangement may be conceivable in which the motor may be provided with an internal gearbox and so a ring gear portion of a turner output drive 92 could be driven directly. Turner gear 60 is configured such that during turning operation of the main rotor shaft 26, it radially constrains the turner output drive 92 so that is cannot deviate from its alignment with the rotational axis R.

To this end, the turner gear 60 includes a mounting assembly 80 with a radial support interface 86 which supports the turner output drive 62. The radial support interface is thus provided a fixed relationship relative to the drivetrain 20 so as to provide suitable radial support to the turner gear 60 and in particular to the turner output drive 92. This ensures that the turner output drive 92 remains aligned with the rotational axis R.

The radial support interface 86 is therefore comprised in a mounting assembly 80 of the turner gear 60. That is to say, the radial support interface 86 may be mounted in and/or supported by the mounting assembly 80. More specifically, in illustrated embodiments, the mounting assembly 80 may include a mounting bracket 82. By way of example, the radial support interface 86 may be comprised in or supported by a mounting bracket 82 of the mounting assembly 80. The mounting bracket 82 may, in embodiments, comprise a plate-like primary body which acts as mounting bracket that fixes the turner drive 60 to an element of the drivetrain housing, such as a gearbox housing 30 or generator housing 53. The mounting bracket 82 may also advantageously provide a rotatable support for a pinion 97 of a drive motor 68. The radial support interface 86 thereby provides circumferential guidance of the turner output drive 92 as it is driven in rotation by the motor 68. Here, a primary body member of the mounting bracket 82 may be rectangular in form. It may be oriented such that long sides thereof are approximately vertical and short sides thereof are approximately horizontal (best seen in FIG. 5). The precise shape of the primary body member of mounting bracket 82 is not crucial to its function. The mounting bracket 82 in this embodiment is shown attached to the generator housing 53 at a short side thereof, by a removable rigid fastening 85. In illustrated embodiments, the removable fastening 85 may comprise one or more a pins or bolts and one or more bores and/or apertures. The turner gear 60 can thereby be removably attached to the drivetrain 20.

In order to ensure that elements of the transmission assembly 90, such as e.g. a turner output drive 92 and e.g. a pinion 97, are securely housed, these may be held in position at the mounting assembly 80 by any suitable means such as conventional securing components or features for moving parts. By way of example, as illustrated in embodiments a retaining plate 89 may be fixed to the mounting assembly 80 for retaining parts of the transmission assembly 90 in position at the mounting assembly 80. The retaining plate 89 may be held in position at the mounting assembly 80 by any suitable means such as by bolts, as illustrated. Preferably, a retaining plate 89 may be fixedly secured to a mounting bracket 82 of the mounting assembly 80. The mounting bracket 82 may be made from a rigid material. It may have a plate-like form. It may be coated with a high-hardness layer, such as a ceramic material layer, to reduce wear. Similarly, a retaining plate 89 may be made from a rigid material. It may have a plate-like form. It may be coated with a high-hardness layer, such as a ceramic material layer, to reduce wear.

Features of the turner gear 60 and drivetrain 20 will be described together with particular reference to FIGS. 4, 5, 6, 7 and 8. In FIG. 5, a turner gear 60 comprising a motor 68, a mounting assembly 80 and a transmission assembly 90 is fixed to a portion of a drivetrain 20. In this embodiment, the portion of the drivetrain 20 to which the turner gear 60 is fixed is a drivetrain housing portion. Specifically, the illustrated drivetrain 20 comprises a generator 24 fixed to a gearbox (not shown). The turner gear 60 is shown fixed to a drivetrain housing portion in the form of a generator housing 53. Preferably, for turning a rotor shaft 26 of a wind turbine 2, the turner gear 60 may be brought to a nacelle 6 and fixed securely in position, as shown, prior to its operation. It may be removed after use, possibly for use at another wind turbine 2. The turner gear 60 may be removed before a wind turbine 2 may be set in operation to produce electrical power. Secure attachment of the turner gear 60 to the drivetrain housing may be achieved by means of e.g. a removable fastening 85, preferably a rigid fastening. The fastening 85 may comprise any arrangement and is illustrated in the form of removable bolts and corresponding holes or bores. The fastening ensures that the mounting assembly 80 of the turner gear 60 is rigidly connected to the drivetrain housing. This may be achieved by fastening a mounting bracket 82 of the turner gear 60 to the drivetrain housing. A motor 68 of the turner gear 60 is also fixed to the mounting assembly 80. Preferably the motor 68 may be directly or indirectly secured to a mounting bracket 82 of the turner gear 60. The turner gear motor 68 is thereby also in a rigid arrangement in relation to the drivetrain 20. A transmission assembly 90 of the turner gear 60 is preferably captured in the mounting assembly 80. The transmission assembly 90 may comprise one or more rotational elements. The elements of the transmission assembly 90 serve to transfer torque from the turner gear motor 68 to a turner gear output drive 92. The turner gear 60 may in particular be attached in such a manner that its output drive 92 is drivingly coupled to a high-speed shaft of the drivetrain 20, which may in particular be a gearbox output shaft 38 or another shaft extended from or coupled to it, such as a generator shaft 62. As can be seen from FIG. 5, the turner gear 60 comprises a motor 68 mounted eccentrically in relation to the rotational axis R of its output drive 92. Moreover, the driving effect of the motor 68 is thereby unevenly distributed about the rotational axis R. Although other configurations of drive motors 68 can be envisaged than the one illustrated in FIG. 5, space constraints or weight or cost or other constraints may make it desirable to arrange motor drives unevenly about the rotational axis R of a turner gear output drive 92.

Figure 6:
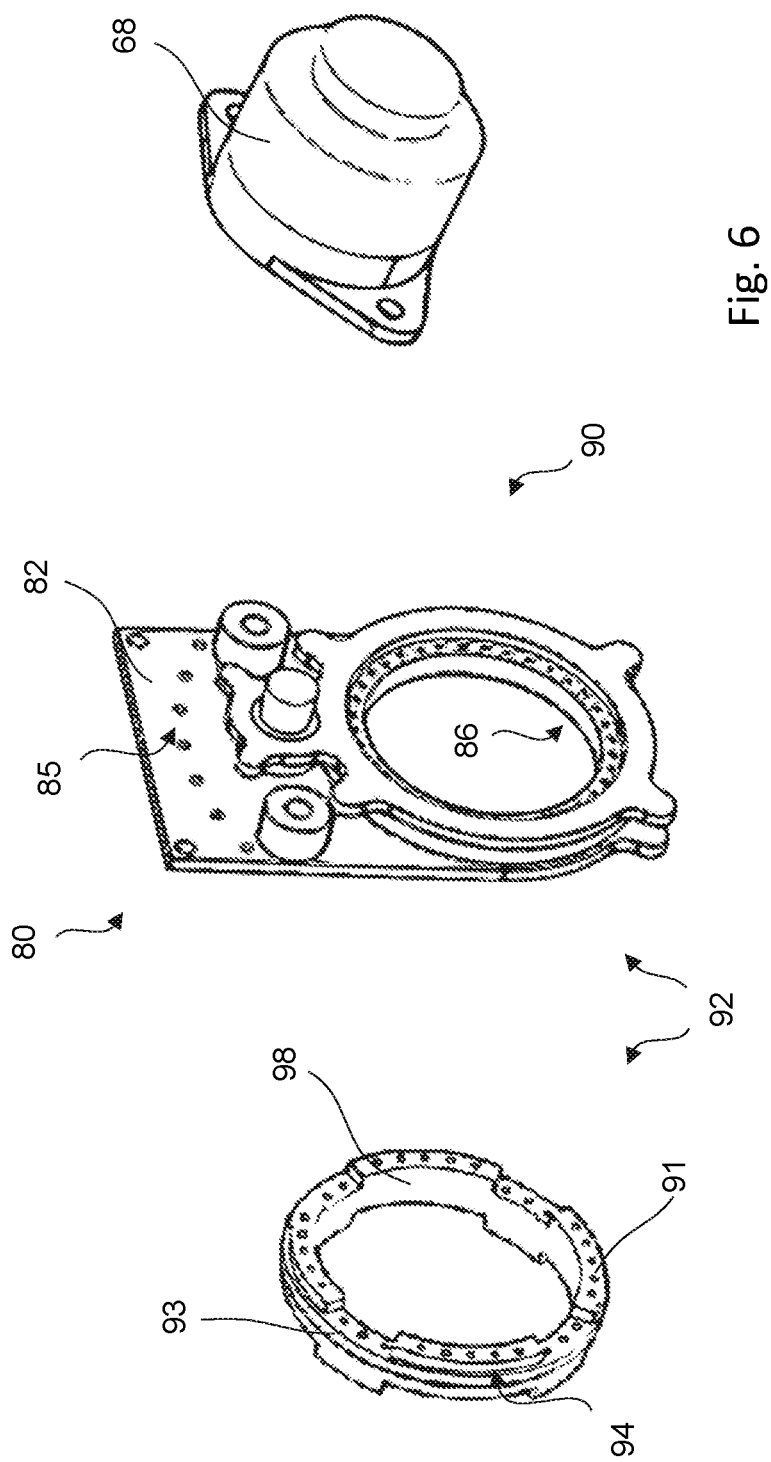
FIG. 6 shows an exploded orthogonal view of a simplified turner gear arrangement including features of the invention.
Figure 7:
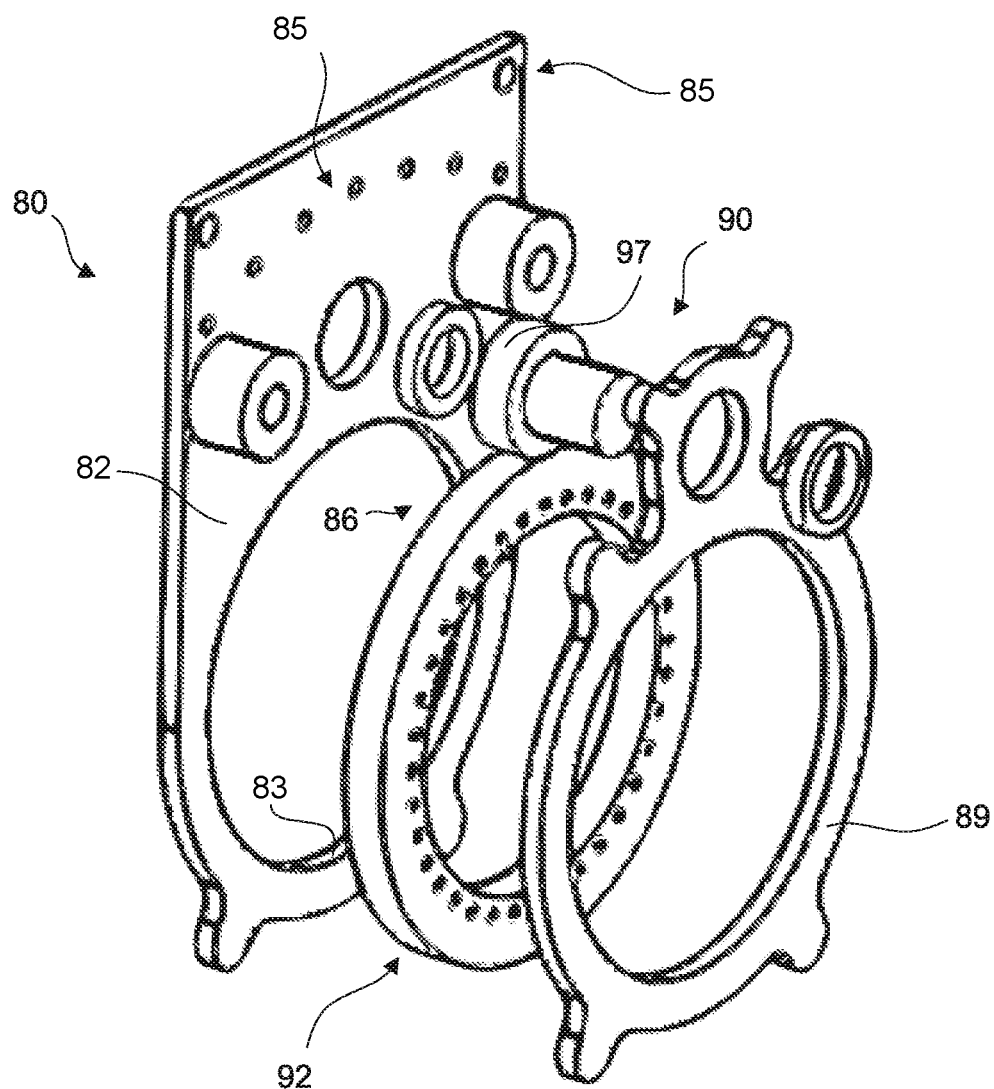
FIG. 7 shows a more detailed view of some elements of a turner gear.

With reference to FIG. 6, in which some further features of the mounting assembly 80 and turner gear output drive 92 are visible, it can be seen that the mounting assembly 80 of the turner gear 60 comprises a radial support interface 86. The radial support interface 86 of the mounting assembly 80 engages with an output guide portion 94 of the aforementioned turner gear output drive 92. In particular, the radial support interface 86 radially constrains the turner gear output drive 92 by its engagement with the output guide portion 94. This prevents the turner gear output drive 92 from being displaced off its rotational axis R while the turner gear motor 68 is actuated. Hence, a gearbox output shaft 38, and thereby a rotor shaft 26 may be driven in rotation by an output drive 92 of the turner gear 60, while the turner gear output drive 92 is prevented from being pushed off its rotational axis R. This also avoids any corresponding, tendency towards radial displacement of the gearbox output shaft 38, and where applicable, also of a generator shaft 62.

Figure 10:
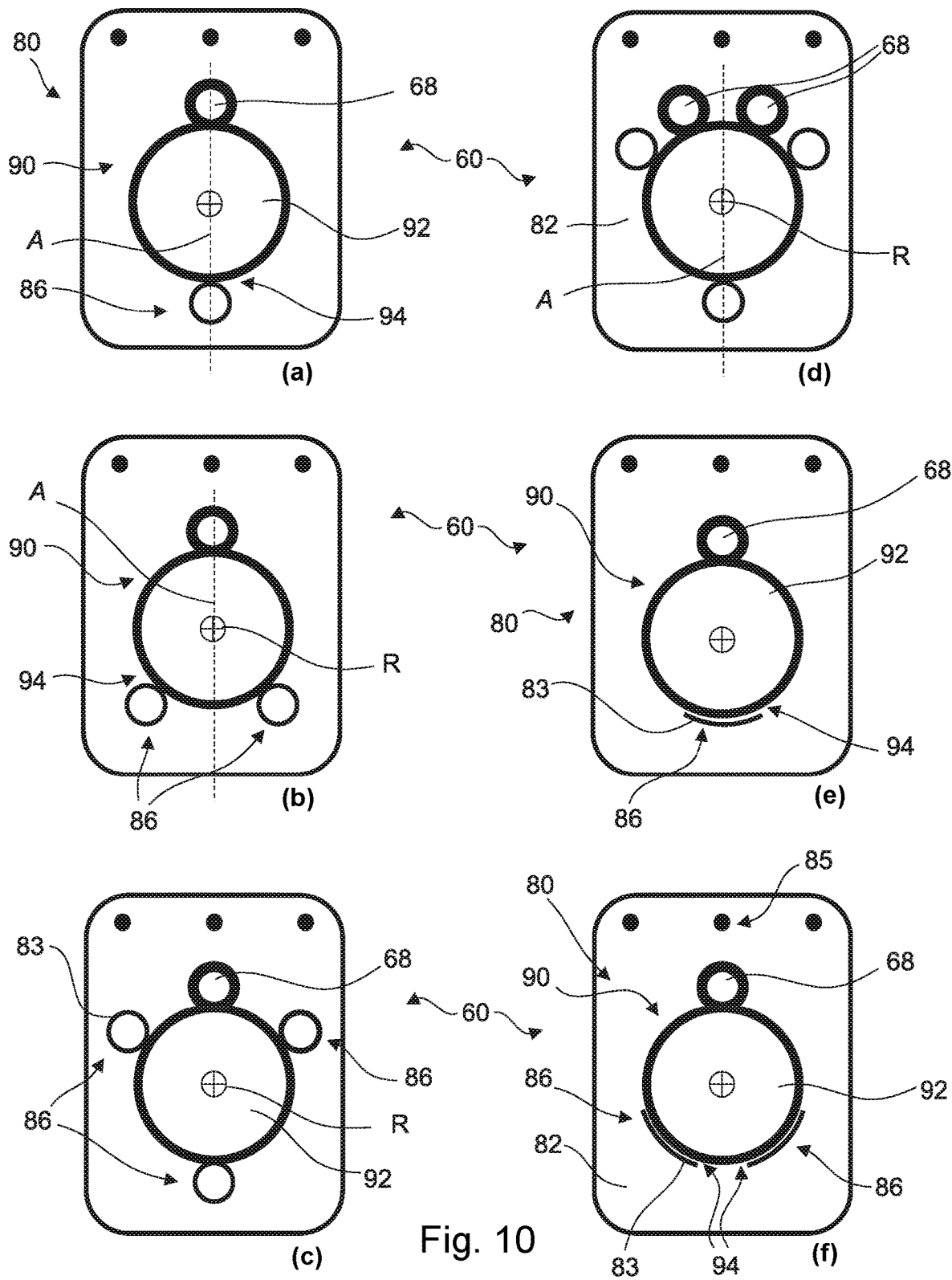
FIGS. 10(*a*)-(*f*) shows a first non-exhaustive series of schematically drawn possible configurations of elements of a turner gear.

In particular, the radial support interface 86 may present one or more abutment surfaces 83 with which the output guide portion 94 may operatively interact during operation of the turner gear 60. The one or more abutment surface 83 as well as the output guide portion 94 may be configured in many different ways in order to achieve the stated effect of radially constraining the turner gear output drive 92. Some possible arrangements are illustrated in FIGS. 10(*a*)-(*f*) and 11(*a*)-(*f*). For example, a radial support interface 86 may comprise stationary elements and/or mobile elements. A stationary element may comprise a circumferentially extending surface of a portion of a mounting assembly 80. A mobile element may for example comprise an idler roller, journalled in a portion of a mounting assembly 80. An abutment surface 83 of a radial support interface may be comprised on a stationary or mobile element of said radial support interface 86. Additional configurations—in addition to the illustrated configurations—may readily be conceived. Additional features of the radial support interface 86 and of a turner gear output drive 92 are discussed hereinafter.

Figure 9:
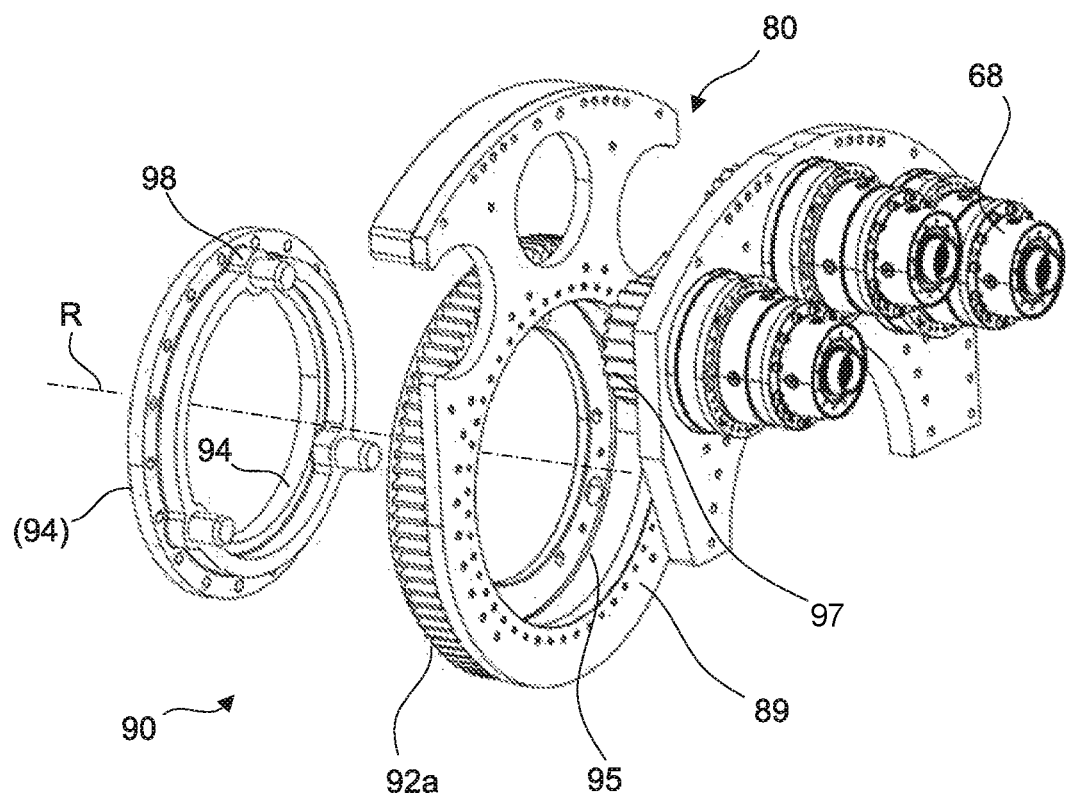
FIG. 9 shows an exploded orthogonal view of still further features of a turner gear.

The turner output drive 92 may comprise a driving engagement surface 92*a*, shown in FIG. 9 by way of a ring gear portion. The driving engagement surface 92*a* may interact with a motor 68 e.g. via a drive pinion 97 or via another drive gear not shown in this embodiment. It should be noted here that, although not shown all the schematic views, driving engagement surface 92*a* and a drive pinion 97 may include external gear teeth that mesh with each other so as to transmit torque between the drive pinion 97 and the turner output drive 92. In particular, the turner output drive 92 may include a driving engagement surface 92*a* and an output guide portion 94.

Figure 8:
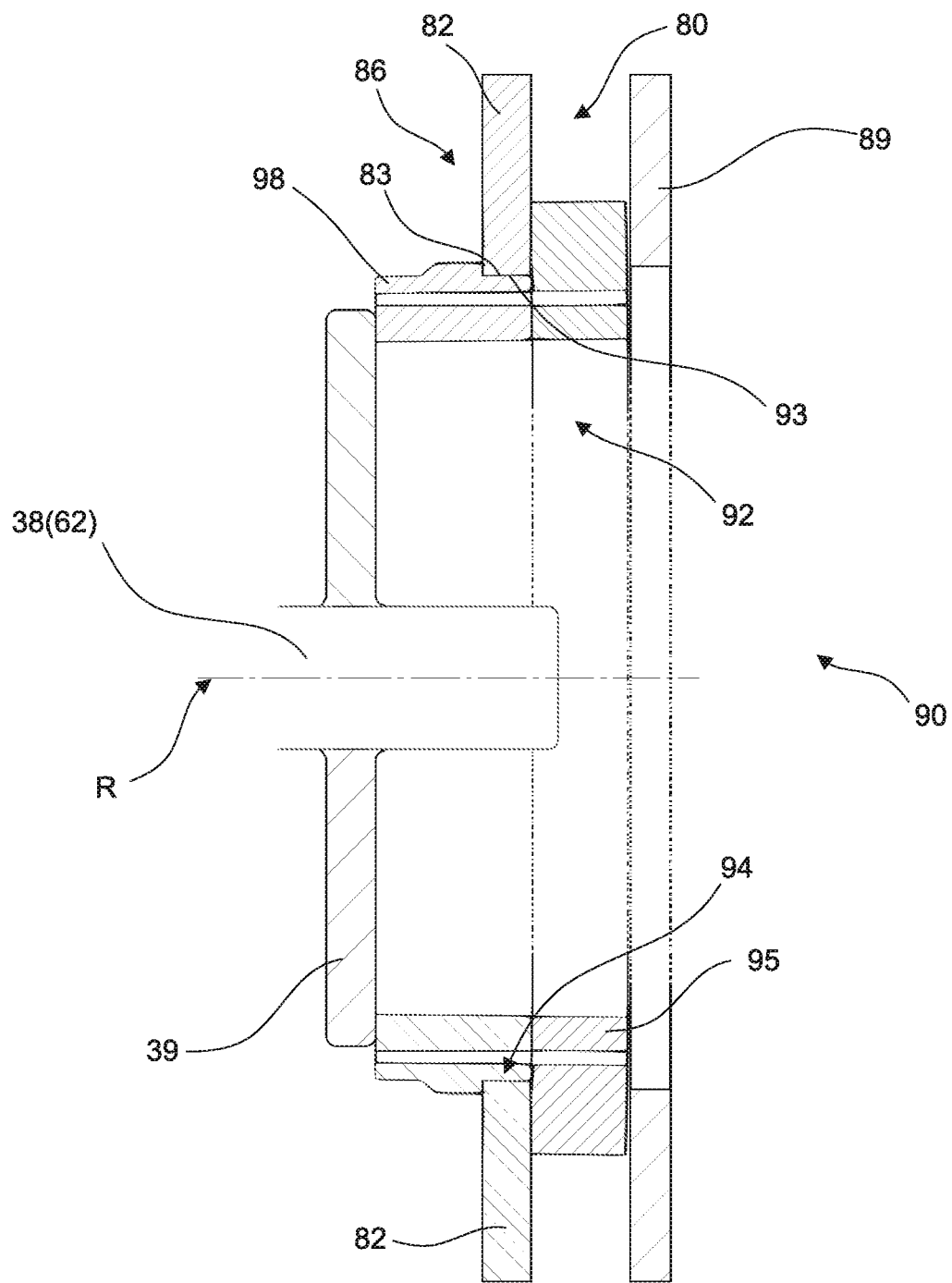
FIG. 8 shows a section view through operative elements of a turner gear.

Furthermore, as shown in FIGS. 6, 8 and 9, a suitable drive adapter 98 may be provided at a turner gear output drive 92. A drive adapter 98 may promote interconnection between the gearbox output shaft 38 and the turner gear output drive 92. This may facilitate the turner drive 60 being used in connection with different arrangements of drivetrain 20. For example, a turner gear arrangement 60 may be provided with multiple drive adapters 98, thereby enabling interconnection with different drivetrain arrangements e.g.

at different wind turbine types. Alternatively, a drive adapter 98 may be configured with multiple fixation modes, enabling connection of the turner gear 60 to a range of different drivetrain interfaces, e.g. at different wind turbine types. To this end, a drive adapter may be provided with one or more mountings 91 which may be for example in the form of flanges, for interconnection to a turner output drive 92 or to a relevant shaft of a drivetrain 20. In the illustrated embodiments, a drive adapter 98 may take the form of an adapter plate which can be drivingly carried by a high-speed shaft of a drivetrain 20 or which can be connected to a drive connector 39 (see FIG. 9) thereof.

As mentioned, a turner gear output drive 92 comprises an output guide portion 94 which interacts with the radial support interface 86 of the mounting assembly 80 keeping the turner output drive 92 on its rotational axis R. Advantageously, the turner output drive 92 may be circular or predominantly circular. The output guide portion 94 may in particular present one or more output bearing surfaces 93 which interact with abutment surfaces 83 on the radial support interface 86 to ensure the turner output drive 92 is kept on its rotational axis R. As with the abutment surfaces 83 of the radial support interface 86, the corresponding output bearing surfaces 93 of the output guide portion 94 may be on stationary or mobile elements thereof. A stationary element may comprise a circumferentially extending bearing surface 93a of an output guide portion 94. A mobile element may for example comprise an idler roller, journalled in a part of an output guide portion 94. A surface of an idler roller at an output guide portion 94 may comprise an output bearing surface 93. In preferred embodiments, the output guide portion 94 may comprise one or more circumferentially extending bearing surfaces 93a. Additional configurations—in addition to illustrated or described configurations—may readily be conceived.

Figure 11:
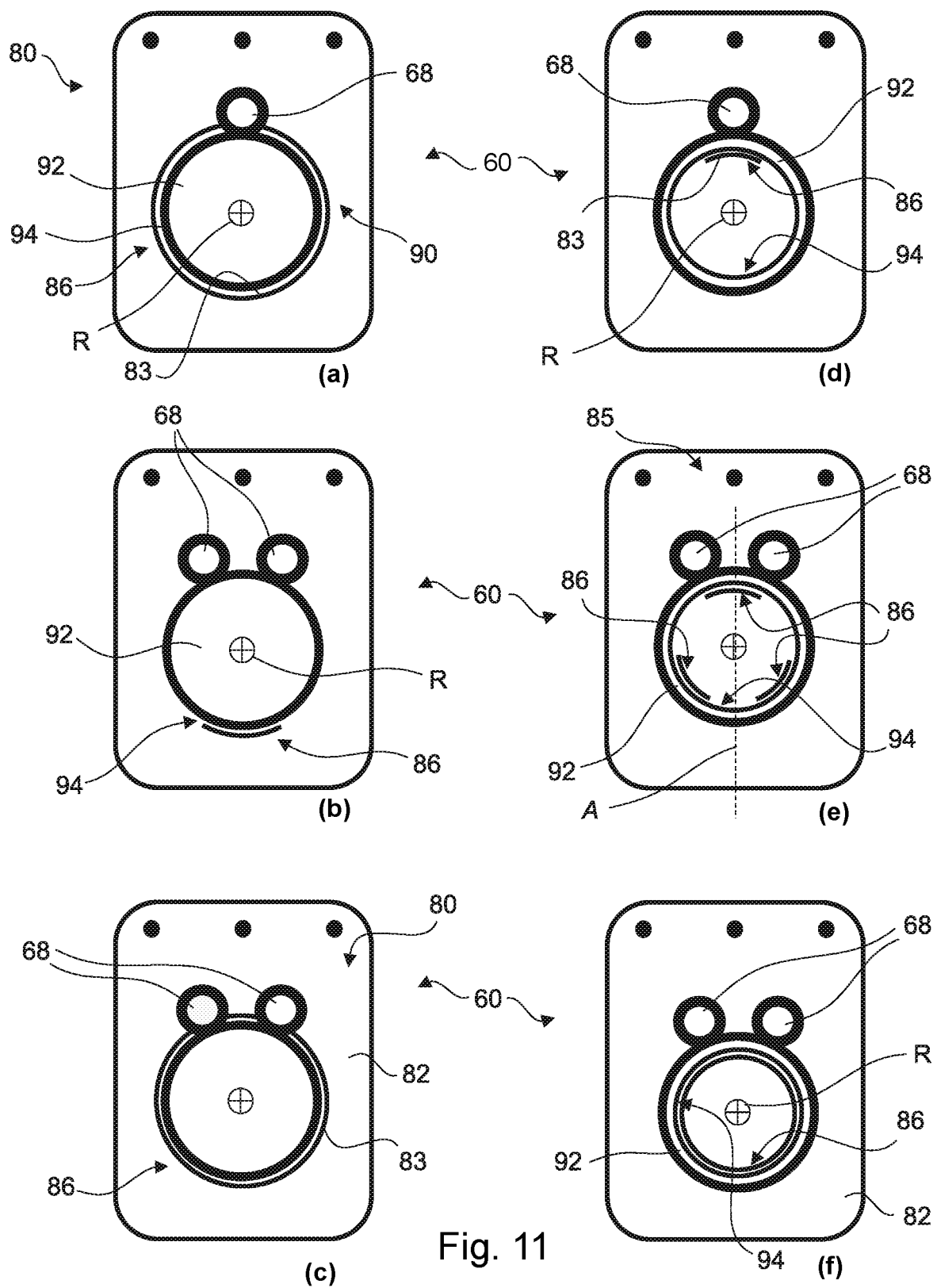
FIGS. 11(*a*)-(*f*) show a second non-exhaustive series of schematically drawn possible configurations of elements of a turner gear.

An output guide portion 94 may be provided anywhere on a turner output drive 92. In examples, a turner output drive 92 may be ring-shaped or circular. An output guide portion 94 may also be generally circular or may be arranged in a circle on the turner output drive 92. The output guide portion 94 may face radially inwards towards the rotational axis R of the turner output drive 92. Thus, it may operatively interact with a radial support interface 86, whose engagement elements or abutment surfaces 83 face radially outward. Alternatively, the output guide portion 94 may face radially outwards, away from the rotational axis R of the turner output drive 92. Thus, it may operatively interact with a radial support interface 86, whose engagement elements or abutment surfaces 83 face radially inwards to the rotational axis R. Variations on arrangements of this type are shown in FIGS. 9, 10 and 11.

A turner output drive 92 may for example comprise a driven element, a guide element, and an output driving interconnection. A said driven element may be comprised in the form of a drive engagement surface 92a; a said guide element may be comprised in the form of an output guide portion 94; a said output driving interconnection may be comprised in the form of a drive adapter 98. Each of these elements may be combined in a single part. Alternatively, the turner output drive 92 may comprise multiple parts, e.g. fixed together. For example, a drive engagement surface 92a may be provided on a rotational drive element 95 of the turner output drive 92, as shown in FIG. 9. As can be seen from e.g. FIG. 8, a turner output drive 92 may comprise a rotational drive element 95 fixed to a drive adapter 98. Preferably the drive adaptor 98 and the rotational drive element 95 may be circumferentially arranged about a common rotational axis (R). In this way, the drive adapter function of the turner output drive 92 may be provided by a separate part than the drive engagement function. In both FIG. 8 and FIG. 9 an output guide portion 94 of the turner output drive 92 is provided at a drive adapter 98. Although not shown, the output guide portion could be provided on a correspondingly configured part of a rotational drive element 95 of a turner output drive 92. Alternatively, an output guide portion may be provided on both a rotational drive element 95 and a drive adapter 98 of a turner output drive 92.

The required radial constraining action by the radial support interface 86 on an output guide portion 94 may be achieved by a variety of configurations. The way in which these elements interact is now discussed with particular reference to FIGS. 10(a)-(f) and 11(a)-(f), and also with reference to FIGS. 6 to 9. In particular, and as already mentioned, one or more abutment surfaces 83 at the radial guide interface 86 interact with one or more bearing surfaces 93 at an output guide portion 94 to thereby radially constrain the turner output drive 92 during operation of the tuner gear 60. For achieving this effect, preferably, at least one of an abutment surface 83 or of an output bearing surface 93 may be configured as a circumferential surface about the rotational axis R. Such a surface may face outward, away from the rotational axis R or it may face inwardly towards the rotational axis R. It may be preferred to configure both an abutment surface 83 and an output bearing surface 93 as circumferentially extending surfaces. These surfaces may slidingly engage and interact to produce the mentioned radial constraining effect during operation of the turner gear. Preferably, the abutment surface 83 and the output bearing surface 93 may both define a full circle. A circular, circumferential output bearing surface 93 is indicated for example in embodiments of FIG. 6, FIG. 4, FIG. 5 and FIG. 8 and further illustrated in FIGS. 10(a)-(f) and 11(a)-(f). For example, a continuous circumferentially extending abutment surface 83 may extend the entire way round the turner output drive 92, in particular around an output guide portion 94 thereof. Moreover, a circumferential output bearing surface 93 may also be a continuous surface. Still further for example, the radial support interface 86 may in some embodiments comprise a circular aperture which is aligned with, that is to say concentric with, with the rotational axis R of the turner gear's output drive 92. See e.g. FIGS. 11(a) and (c) and FIGS. 8, 7 and 4. The circular aperture may be shaped to complement and receive output bearing surfaces 93 of an output guide portion 94 of the turner output drive 92. Such a circular aperture may therefore provide a radially inward facing circumferential sliding surface that extends about, and is slidably mated with, one or more radially outwardly facing output bearing surfaces 93 of the output guide portion 94. It may be noted that the output bearing surfaces 93 In this embodiment, the radial support interface 86 acts as a journal bearing for the turner output drive 92. The abutment surface 83 at a radial support interface 86 may alternatively be configured facing outward, away from the axis of rotation R, as illustrated for example in FIG. 11(f). The two circumferential mating surfaces e.g. 83, 93, may be treated with a suitable tribological means e.g. a coating, so as to reduce friction, as would be known to the skilled person.

In embodiments, it may be preferred to configure either the abutment surfaces 83 or the bearing surfaces 93 as surfaces of idler rollers. Configurations in which idler rollers are implemented as abutment surfaces 83 at a radial support interface 86 are shown by way of example in FIGS. 10(a)-(d). Although not shown, similar idler rollers could be implemented as output bearing surfaces 93 at an output guide portion 94 of turner gear output drive 92. In still further embodiments, the circumferentially configured abutment surface 83 may be provided in the form of more than one circumferentially extending abutment surface 83, arranged about the rotational axis R. In such an arrangement each abutment surface may extend along only a part of a circle, as illustrated for example in FIGS. 11(*b*), (*d*), (*e*) or FIGS. 10(*e*) and (*f*).

In some embodiments, a turner output drive may be provided in which its output guide portion 94 faces radially towards the rotational axis R, as illustrated for example in FIGS. 11(*d*), (*e*) and (*f*). Whether the output bearing surface 93 or the abutment surface 83 faces inward or outward, and whether either of them is configured in the form of idler rollers or as a circular or part-circular surface, it is preferred that their interacting parts are arranged along or symmetrically about an alignment A between a turner drive motor 68, or a drive pinion 97 thereof, and the rotational axis R. This ensures that a pushing action by the drive pinion 97 along an alignment A between the drive pinion and the rotational axis R, and thereby tending to push the turner output drive off-axis in a radial direction, will be counteracted by the radial support interface 86, in particular, by an abutment surface 83 or a portion thereof. In embodiments, as illustrated in FIG. 9 or in FIG. 10(*d*) or 11(*c*), (*e*) or (*f*), a turner gear motor 68 may be provided as a cluster of motors. In such an arrangement the mentioned alignment A may be understood to pass through a centreline of the cluster of motors 68, or more specifically, through a centreline of a cluster of pinions 97 associated with respective motors.

A further technical advantage of the arrangement described above is that a section of the drivetrain's high-speed shaft at the generator 24 may not require its own additional bearing. This may confer additional advantages, one of which is the relatively 'open' volume within the generator, which provides accessibility and airflow advantages as well as contributing to a generator with a lighter mass.

The specific arrangements shown in the figures demonstrate technical implementations which embody the invention. Some variants of the specific embodiments have been discussed above. Others are possible within the scope of the appended claims.

The invention claimed is:

1. A turner gear arrangement for turning a rotor of a wind turbine via a drivetrain thereof;
   said turner gear arrangement comprising a motor, a torque transmission assembly, and a mounting assembly;
   said torque transmission assembly comprising one or more rotational elements and including a turner output drive rotatable about an axis, said turner output drive being operably coupled to and driven by said motor and configured to transmit rotational motion to a gearbox output shaft of said drivetrain, said turner output drive further including an output guide portion;
   said mounting assembly being configured to mount said motor and said transmission assembly in a fixed relation with respect to said wind turbine drivetrain; and
   wherein said mounting assembly further includes a radial support interface which operably engages with said output guide portion, to constrain movement of said turner output drive in a direction transverse to a rotational axis of said turner drive;
   wherein said turner gear arrangement includes a mounting bracket fixable to a drivetrain housing; and
   wherein said mounting bracket fastens said motor that is operatively coupled to the turner output drive.

2. The turner gear arrangement of claim 1, wherein said radial support interface comprises an abutment surface arranged at one or more points circumferentially around said rotational axis of said turner output drive and operatively engaging with said output guide portion.

3. The turner gear arrangement of claim 2, wherein said radial support interface comprises one or more mounting bearing surfaces which extend circumferentially about said turner output drive axis arranged at one or more points circumferentially around said rotational axis of said turner output drive, or one or more idler rollers arranged at one or more points circumferentially around said rotational axis of said turner output drive.

4. The turner gear arrangement of claim 2, wherein said output guide portion is arranged circumferentially about said rotational axis of said turner output drive and is operatively engageable with said abutment surface of said radial support interface; wherein said output guide portion comprises a circumferentially extending bearing surface, extending about said rotational axis of said turner output drive.

5. The turner gear arrangement of claim 4, wherein said output guide portion faces radially towards said rotational axis of said turner output drive; or wherein said output guide portion faces radially away from said rotational axis of said turner output drive.

6. The turner gear arrangement of claim 1, wherein said motor and said rotational axis of said turner output drive, define an alignment and wherein said radial support interface is positioned in said mounting assembly at, or symmetrically about, a location on said alignment.

7. The turner gear arrangement of claim 1, wherein said radial support interface is comprised in said mounting bracket of said mounting arrangement.

8. The turner gear arrangement according to claim 1, wherein said turner output drive includes a rotational drive element with a drive adaptor fixed thereto, said drive adaptor being releasably engageable with an output drive shaft of said drivetrain to thereby transmit rotational drive between said rotational drive element and said drivetrain output drive shaft.

9. The turner gear arrangement of claim 8, wherein said output guide portion is provided at one or more of said drive adaptor or said rotational drive element.

10. The turner gear arrangement of claim 1, said motor comprising one motor or a cluster of motors, and wherein said motor or said cluster of motors is arranged unevenly distributed about said rotational axis in the direction transverse to said rotational axis.

11. A wind turbine drivetrain arrangement, comprising:
    a drivetrain including a rotor shaft fixable to a wind turbine rotor hub, a gearbox and a drivetrain housing, wherein the rotor shaft is coupled to the gearbox at a gearbox input coupling, and wherein the gearbox includes an output drive shaft defining a rotational axis;
    said drivetrain arrangement further comprising a turner gear arrangement as claimed in claim 1, said transmission assembly of said turner gear arrangement being drivingly coupled to the gearbox output shaft so as to transfer torque to the rotor shaft through said gearbox, wherein said radial support arrangement of said turner gear assembly is in a fixed relationship to the drivetrain housing and constrains movement of the rotational drive element of said transmission assembly in a direction transverse to its rotational axis.

12. The drivetrain arrangement of claim 11, wherein said drivetrain is connected to a generator, said generator includes a rotor and a stator; said gearbox output shaft being drivingly connected to said rotor; wherein the generator rotor includes a hub component to which the turner gear output drive is drivingly coupled.

13. The drivetrain arrangement of claim 12, wherein a mounting bracket of said turner gear mounting assembly is fixed to said drivetrain housing; wherein said mounting bracket is fixed to a generator housing of the drivetrain housing.

14. The drivetrain arrangement of claim 11, further including a drive connector coupled in driving engagement between said turner gear output drive of said turner gear and said gearbox output shaft.

15. The drivetrain arrangement of claim 11, further including a generator; wherein said drivetrain housing includes a main bearing housing at a main bearing of said rotor shaft, and wherein said gearbox and said generator are mounted cantilevered on said main bearing housing.

* * * * *